(12) United States Patent
Haeg et al.

(10) Patent No.: US 10,992,193 B2
(45) Date of Patent: Apr. 27, 2021

(54) LINEAR MOTOR WITH ARMATURE COOLING CHANNELS

(71) Applicant: MTS Systems Corporation, Eden Prairie, MN (US)

(72) Inventors: Steven Robert Haeg, Minnetonka, MN (US); Dmitrii Tarasovich Pokhil, Arden Hills, MN (US); Charles Groepper, Waconia, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 152 days.

(21) Appl. No.: 16/155,052

(22) Filed: Oct. 9, 2018

(65) Prior Publication Data

US 2019/0109501 A1 Apr. 11, 2019

Related U.S. Application Data

(60) Provisional application No. 62/570,353, filed on Oct. 10, 2017.

(51) Int. Cl.
*H02K 1/20* (2006.01)
*H02K 41/02* (2006.01)
*H02K 41/03* (2006.01)
*H02K 9/19* (2006.01)
*F16C 29/00* (2006.01)

(52) U.S. Cl.
CPC .............. *H02K 1/20* (2013.01); *F16C 29/005* (2013.01); *H02K 9/19* (2013.01); *H02K 41/031* (2013.01)

(58) Field of Classification Search
CPC ...... H02K 41/03; H02K 41/031; H02K 41/02; H02K 9/19; H02K 9/197; H02K 1/20; F16C 29/00; F16C 29/005
See application file for complete search history.

(56) References Cited

U.S. PATENT DOCUMENTS

| | | | | |
|---|---|---|---|---|
| 5,783,877 A | * | 7/1998 | Chitayat | H02K 9/005 310/12.02 |
| 6,469,406 B1 | * | 10/2002 | Hwang | H02K 41/031 310/12.27 |

(Continued)

FOREIGN PATENT DOCUMENTS

| | | | | |
|---|---|---|---|---|
| FR | 2607332 A1 | * | 5/1988 | ........... H02K 41/025 |
| FR | 2607332 A1 | | 5/1988 | |

(Continued)

OTHER PUBLICATIONS

International Search Report and Written Opinion of the International Searching Authority dated Jan. 2, 2019 for corresponding Interrnational Application No. PCT/US2018/055023, filed Oct. 9, 2018.

*Primary Examiner* — Edgardo San Martin
(74) *Attorney, Agent, or Firm* — Steven M. Koehler; Westman, Champlin & Koehler, P.A.

(57) ABSTRACT

An electric linear motor includes a support structure, a stator assembly secured to the support structure, and an armature assembly secured to the support structure for guided movement relative to the stator assembly. The armature assembly includes a plurality of magnetic devices and a core support supporting each of the magnetic devices in spaced apart relation to the stator assembly. The core support has a plurality of fluid cooling passageways formed therein.

20 Claims, 6 Drawing Sheets

(56) References Cited

U.S. PATENT DOCUMENTS

| | | | | |
|---|---|---|---|---|
| 6,528,907 B2 * | 3/2003 | Hwang | ................... | F28D 15/02 |
| | | | | 310/12.29 |
| 6,731,029 B2 * | 5/2004 | Shikayama | ............ | H02K 5/128 |
| | | | | 310/12.01 |
| 6,825,583 B2 * | 11/2004 | Joung | ................... | H02K 41/03 |
| | | | | 310/12.29 |
| 8,674,562 B2 * | 3/2014 | Yoshida | ................... | H02K 3/24 |
| | | | | 310/12.29 |
| 9,178,401 B2 * | 11/2015 | Sugita | ....................... | H02K 9/20 |
| 2016/0118872 A1 * | 4/2016 | Chen | ................... | H02K 41/031 |
| | | | | 310/12.24 |

FOREIGN PATENT DOCUMENTS

| | | | | |
|---|---|---|---|---|
| JP | 10257750 A | * | 9/1998 | |
| JP | 11027926 A | * | 1/1999 | |
| JP | 2002044928 A | | 7/2000 | |
| JP | 2000333438 A | | 11/2000 | |
| JP | 2002044928 A | * | 2/2002 | |
| JP | 2002165433 A | * | 6/2002 | |
| JP | 2002218730 A | | 8/2002 | |
| WO | WO-2004088827 A1 | * | 10/2004 | |

* cited by examiner

LINEAR MOTOR WITH ARMATURE COOLING CHANNELS

CROSS-REFERENCE TO RELATED APPLICATION

The present application is based on and claims the benefit of U.S. provisional patent application Ser. No. 62/570,353, filed Oct. 10, 2017, the content of which is hereby incorporated by reference in its entirety.

BACKGROUND

The discussion below is merely provided for general background information and is not intended to be used as an aid in determining the scope of the claimed subject matter.

Electric linear motors include a stator winding typically secured within or to a housing and an armature mounted for linear movement with respect to the stator winding. Current is controlled through the stator winding to create magnetic fields, which interact with magnetic fields provided on the armature to control linear movement of the armature. In operation, the core of the armature is heated. Improved cooling of the armature is desired.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An electric linear motor includes a support structure, a stator assembly secured to the support structure, and an armature assembly secured to the support structure for guided movement relative to the stator assembly. The armature includes a plurality of magnetic devices and a core support supporting each of the magnetic devices in spaced apart relation to the stator assembly. The core support has a plurality of fluid cooling passageways formed therein.

Implementations may include one or more of the following features. The cooling passageways can be arranged in the core to aid in cooling or improving magnetic field lines carried by the core. With respect to improving cooling, a fluid cooling passageway can be arranged proximate each magnetic device, and if desired each fluid cooling passageway can be disposed along a plane bisecting each magnet device.

The cooling passageways can be arranged in the core in any desired pattern; however, in one embodiment each fluid cooling passageway extends from a first edge of the core support to a second edge of the core support on a side opposite the first edge, and in a further embodiment, where each of the fluid cooling passageways are oriented orthogonal to linear motion of the armature assembly. At least two ports are provided to connect the cooling passageways to a source of cooling fluid, for example, a liquid. The cooling passageways can be fluidly coupled together with coupling passageways or otherwise formed so to extend, for example, in a zig-zag pattern through the core between two ports. A single such pattern, or zone, can be provided in the core, or multiple zones can be arranged where each zone includes port(s) connected to the fluid source, which can include a pump.

If used, each coupling passageway fluidly couples in a successive manner adjacent fluid cooling passageways in the core support. The coupling passageways can be separate elements connected to the core, or formed therein where at least a portion a wall of each coupling passageway is formed from material of the core support. A first guide member for the armature assembly is secured to the first edge and a second guide member secured to the second edge, each guide guides the armature assembly for linear movement relative to the core support. If desired, each of the guides forms at least a portion of the wall of each coupling passageway.

To aid in magnetic field lines carried by the core support, one or more, and in one embodiment, each fluid cooling passageway is disposed in the core at a location of lower magnetic flux density.

DETAILED DESCRIPTION OF ILLUSTRATIVE EMBODIMENTS

Figure 1:
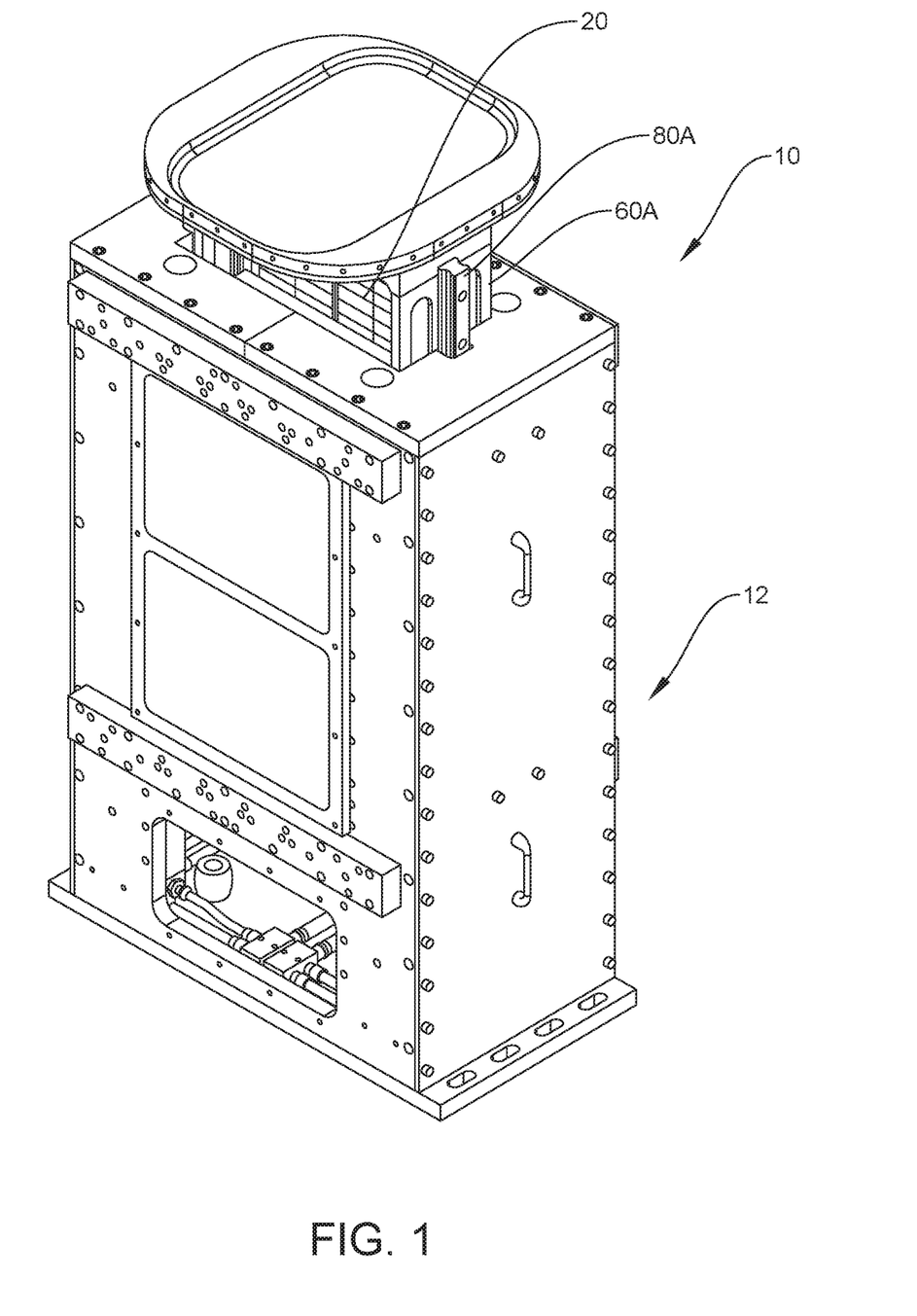
FIG. 1 is a perspective view of an exemplary linear motor.
Figure 2:
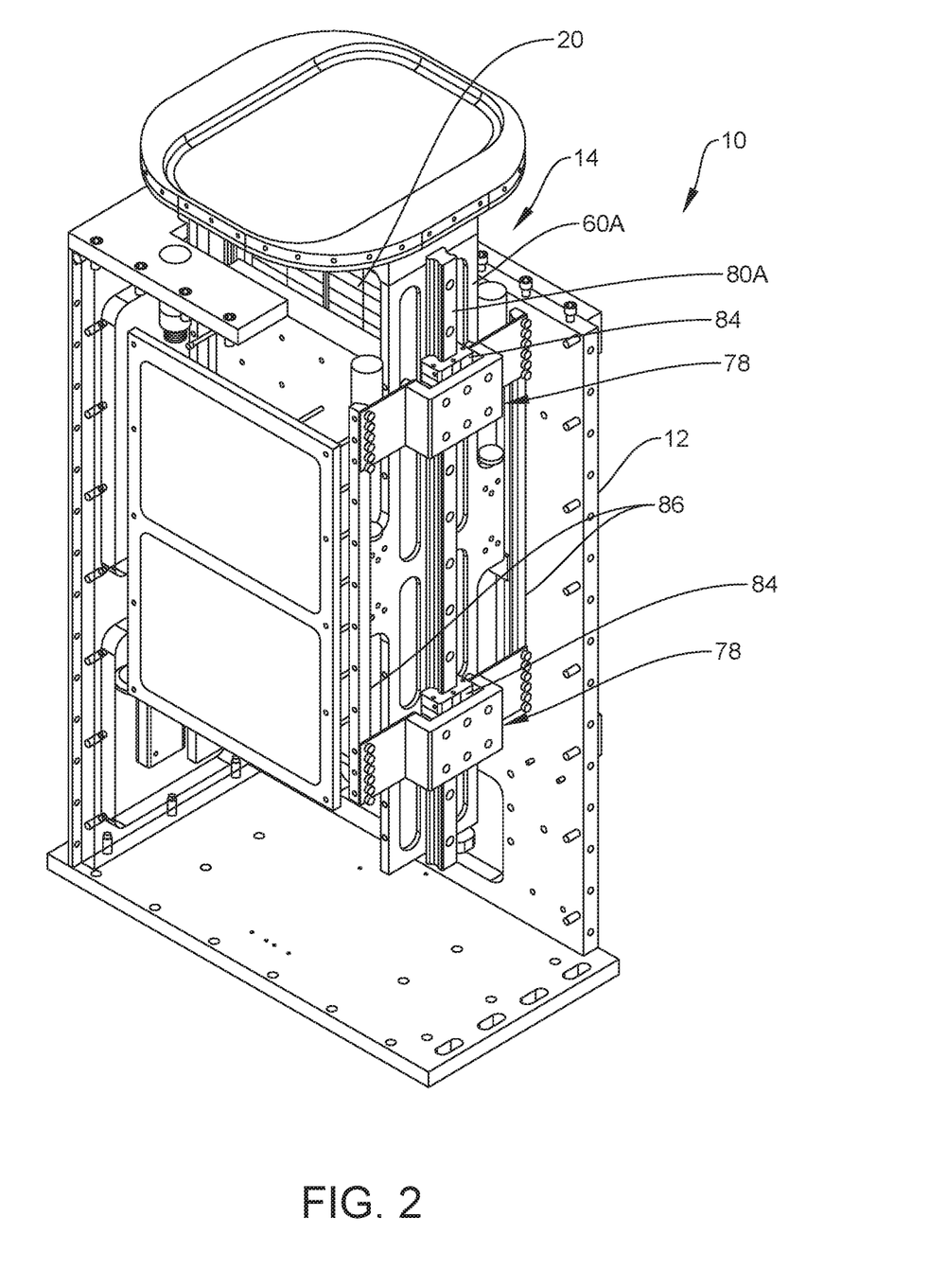
FIG. 2 is a perspective view of the linear motor with portions removed.
Figure 3:
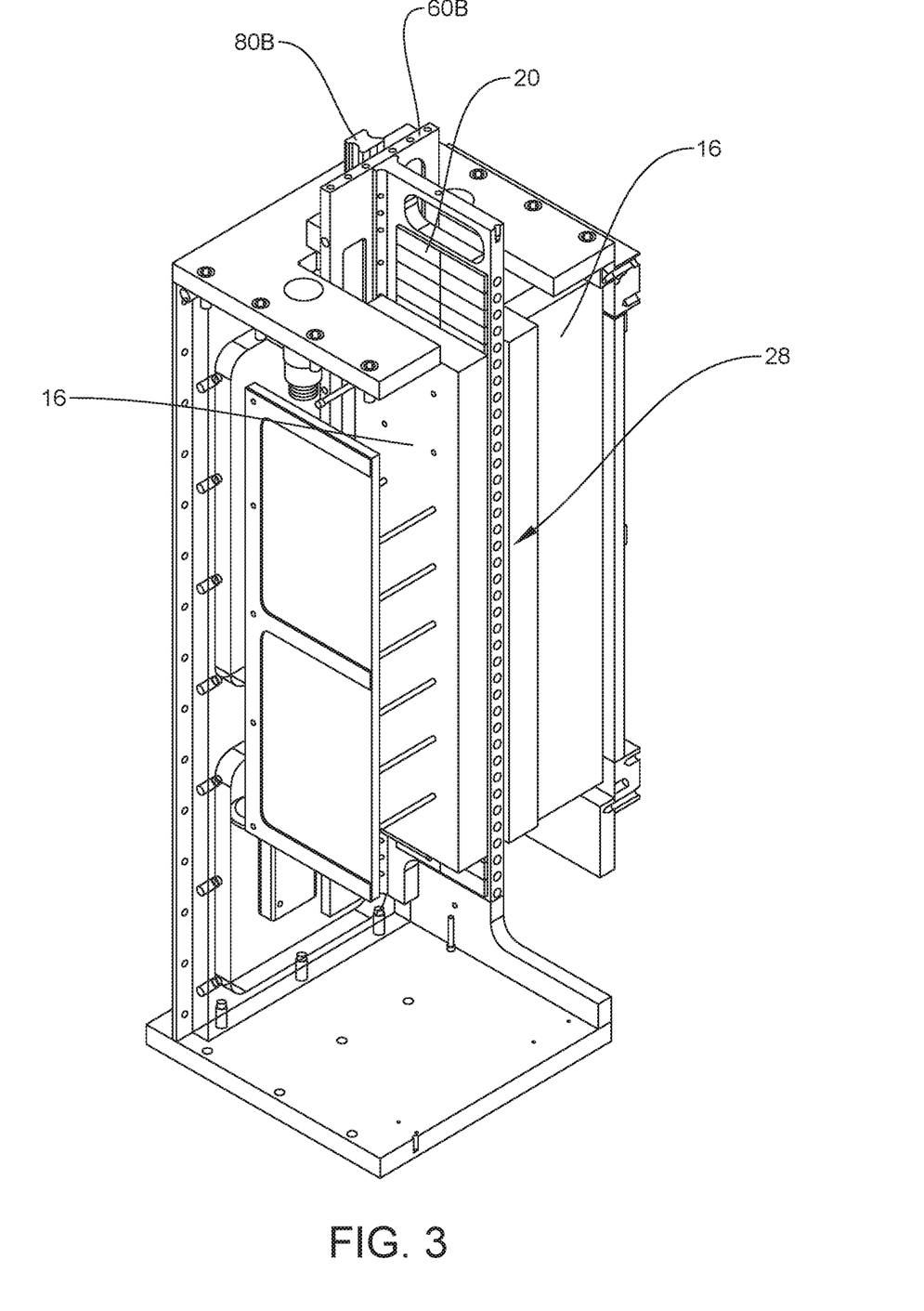
FIG. 3 is a sectional view of the linear motor along an axis of motion of the armature.
Figure 4:
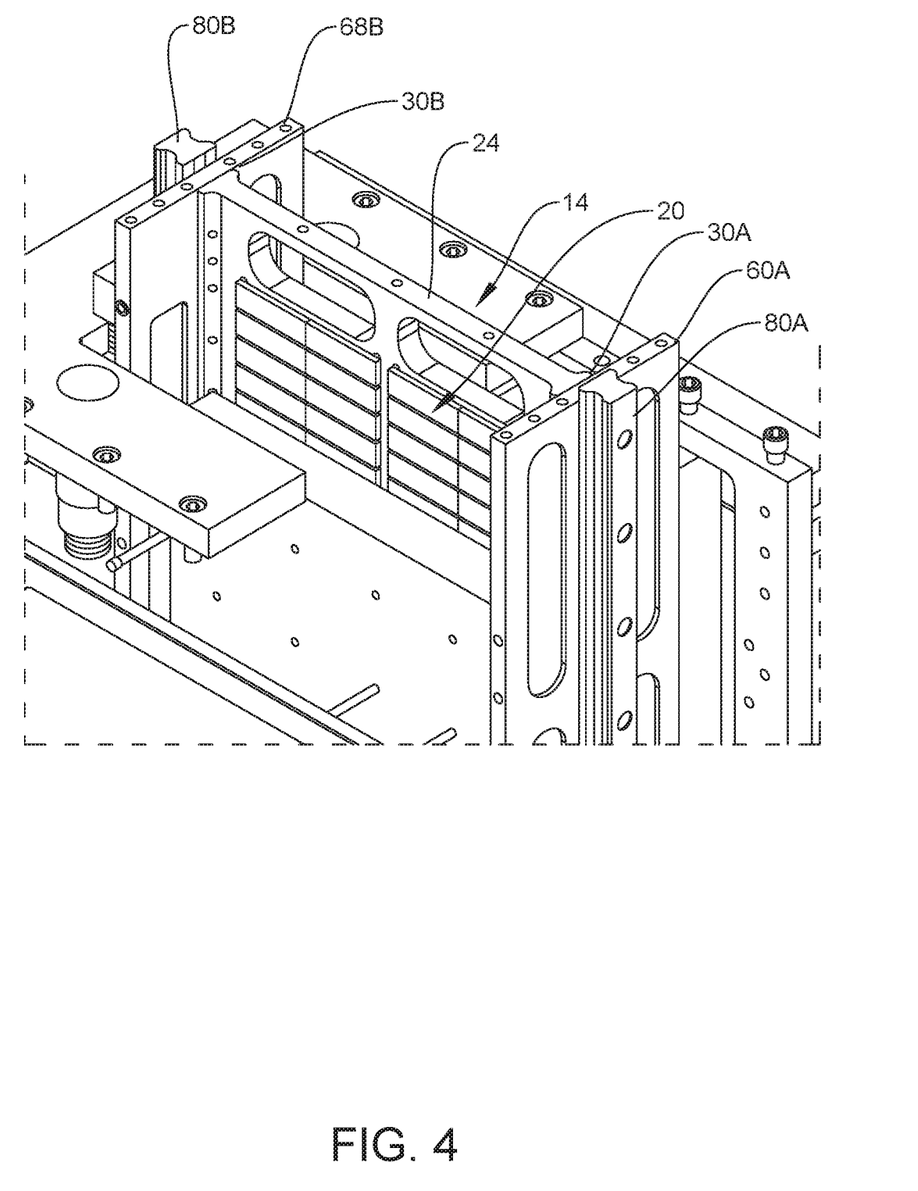
FIG. 4 is an enlarged view of a portion of the linear motor with components removed.
Figure 5:
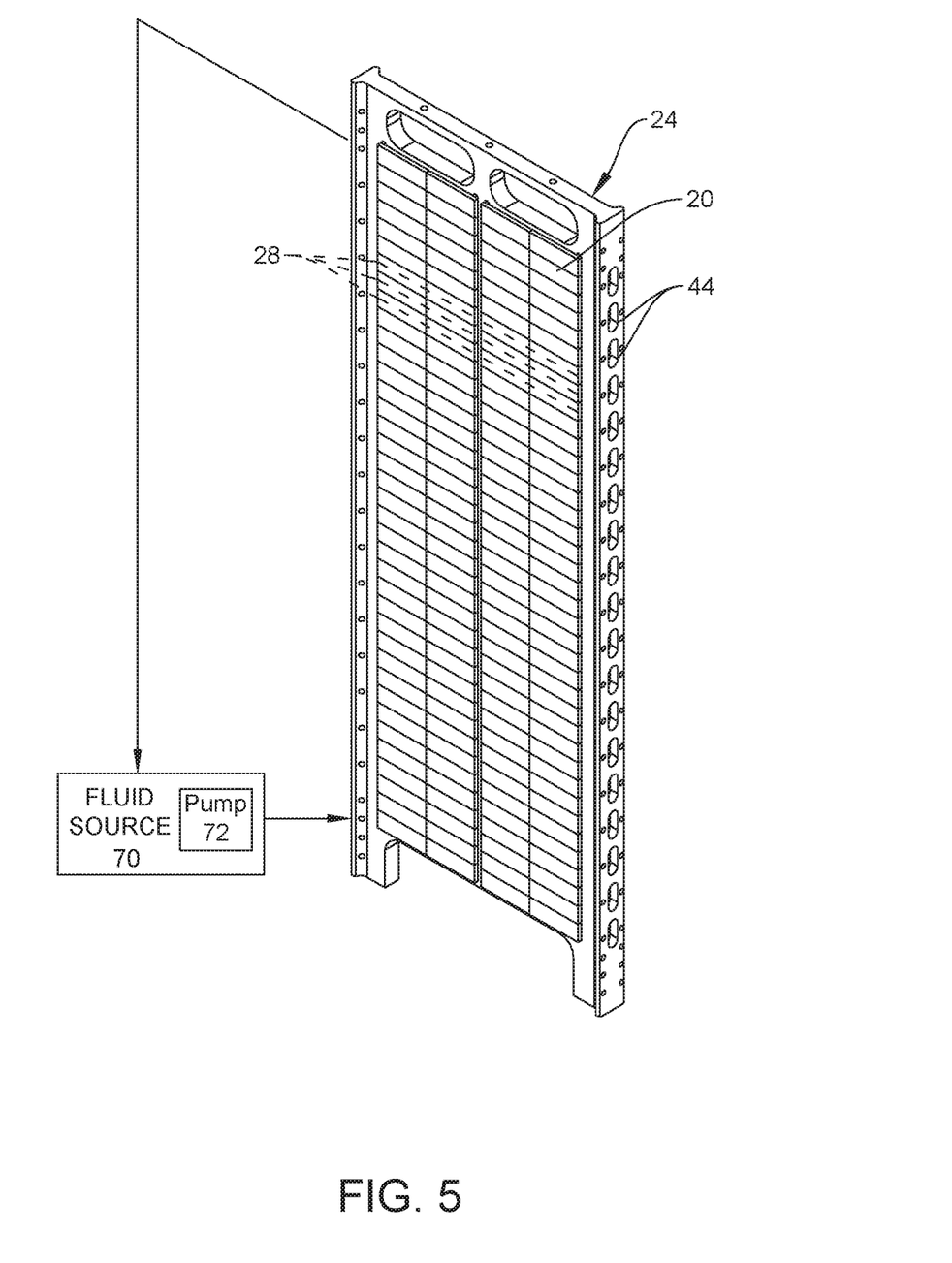
FIG. 5 is a perspective view of an armature core.

Referring to the drawings wherein like reference numbers represent the same or similar components throughout the several figures, FIG. 1 illustrates a linear motor or actuator 10. The linear motor 10 includes a support structure 12 that can, if desired, further function as a housing. Referring also to FIG. 2, the linear motor 10 includes an armature assembly 14. In the embodiment illustrated, the armature assembly 14 includes at least one set of magnetic devices 20, typically magnets but could also be windings, mounted or secured to a core support 24 (FIG. 5). Using magnets by way of example, the magnets 20 are arranged in a conventional manner with alternating north and south polarities so as to interact with magnetic fields generated by windings of a stator assembly 16. Controlled movement of the armature assembly 14 through the stator assembly 16 is well known and will not be further described in detail since such details are not pertinent to the present invention.

As indicated in the background section, the armature assembly 14 generates heat during operation, which is preferably removed using aspects of the present invention. In particular, the armature assembly 14 is provided with fluid, preferably a liquid, coolant through a ferrous core support 24 of the armature assembly 14 during operation so as to remove the heat present therein.

Figure 6:
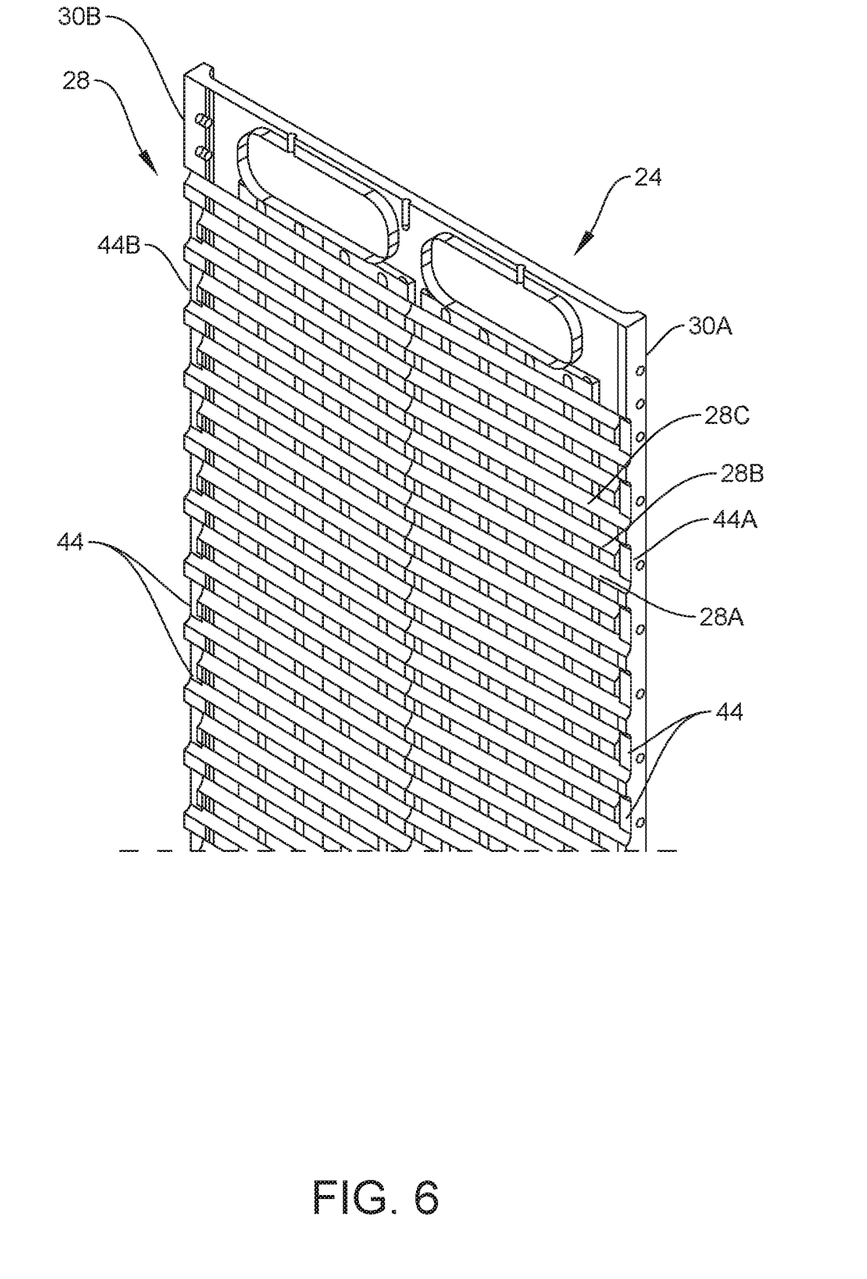
FIG. 6 is a partial sectional view of an armature core.

Referring to FIGS. 5 and 6, the core support 24 includes a plurality of cooling channels or passageways 28 arranged therein and preferably extending from a first side edge 30A of the core support 24 to an opposite side edge 30B. The magnets 20 are secured to the core support 24 using conventional techniques such as bonding. It should be noted that a thermal conductive adhesive can be used to bond the magnets 20 to the core support 24 so as to improve thermal conductivity between the magnets 20 and the core support 24. If desired, each of the magnets 20 can be located within a corresponding recess provided in the core support 24 to improve fixation of each magnet 20 to the core support 24. An epoxy covering can be provided over the magnets 20, if desired.

In a preferred embodiment, a cooling passageway 28 is provided in the core support 24 opposite each of the magnets 20. In the embodiment illustrated, the armature assembly 14 includes a first set of the magnets 20 on a first side of the armature assembly 14 and a second set of magnets (not shown but similarly arranged) on an opposite side of the armature assembly 14, each set of magnets 20 interacting with a corresponding winding of the stator assembly 16. In the embodiment illustrated, each of the cooling passageways 28 is a common cooling passageway used to remove heat from each side of the armature assembly 14. Although separate passageways could also be used, for example arranged in pairs of parallel cooling passageways where one cooling passageway of each pair cools a magnet on one side of the core support 24 and the other cooling passageway of each pair cools a magnet on one opposite side, a common cooling passageway associated with magnets 20 on each side of the armature assembly 14 may be preferable so as to minimize the amount of core material removed from the core support 24 to form the passageways 28.

Magnetic flux from the magnets 20 is present in the core support 24 and it is preferable to maintain as much material as possible within the core support 24 for the magnetic flux from the magnets 20 as well as to provide for structural support of the core support 24. It has been found, however, that location of the cooling passageways 28 within the core support 24 can be optimized so as to minimize interference with magnetic flux. In particular, in a preferred embodiment, the cooling passageways 28 are disposed within the core support 24 so as to extend along a path coinciding with a middle or center of each magnet 20, preferably, orthogonal to an axis of motion of the armature assembly 14 (which is generally up and down in the figures but this should not be considered limiting). Stated another way, the each fluid cooling passageway 28 is disposed along a plane bisecting each magnet 20. Besides being located in an area of the core support 24 or a portion of the core support 24 with reduced flux density, such a location with respect to each magnet 20, is also near locations of highest heat generation in the armature assembly 14.

As indicated above, coolant flow through the passageways is edge 30A to edge 30B in the core support 24. In one embodiment, fluid flows through the passageways 28, or a portion of the passageways 28 successively in a zig-zag manner. To provide fluid flow successively through the core support 24, coupling passageways 44 are provided between each cooling passageway 44 extending through the core support 24. FIGS. 5 and 6 illustrate portions of coupling passageways 44 provided on each edge of the core support 24. Referring by way of example to cooling passageways 28A, 28B and 28C, coupling passageways 44A and 44B are provided so as to allow fluid flow successively through passageway 28A to passageway 28B and then to passageway 28C (however, it should be understood that fluid flow could also flow the other direction) where coupling passageway 44A couples passageway 28A to 28B at the edge 30A and coupling passageway 44B couples passageway 28B to 28C at edge 30B.

In the embodiment illustrated, side manifolds 60A and 60B are provided so as to provide surfaces to form at least a portion of the walls of the coupling passageways 44. In particular, manifolds 60A and 60B are secured to edges 30A and 30B, respectively, of the core support 24 where a surface of each manifold 60A, 60B facing or secured to the edge faces of the core have portions that form inner walls of each of the cooling coupling passageways 44. The manifolds 60A, 60B are secured to edges of the core so as to seal each of the coupling passageways 44. Although the coupling passageways 44 could be formed within the core support 24 use of the manifolds 60A, 60B forms a convenient assembly that is easier to manufacture.

In the embodiment illustrated, a first port 62 is provided at one end of the core support 24 while a second port, not shown, is provided at an opposite end of the core support 24 such that continuous fluid flow in a zig-zag manner is present between the first and second ports; however, this should not be considered limiting in that if desired, additional ports can be provided if it is desirable to not have a just single fluid path through the core support 24. Each of the ports is coupled to a fluid source 70 that can include a pump 72 (schematically illustrated in FIG. 5 but without the manifolds 60A, 60B). Coupling of the fluid source 70 and pump 72 to the passageways 28 of the core support 24 can be provided with suitable flexible lines connected to the ports, which may extend through corresponding apertures provided in the manifolds 60A. 60B. In one embodiment where a first port 62 is provided at one end of the armature assembly 14 and a second port is provided at the other end of the armature assembly 14, separate flexible lines can be attached thereto; however, in a further embodiment, a passageway within one of the manifolds can be provided extending along a length of the manifold such that each of the ports can be provided on one end of the armature. Preferably, the fluid is a liquid.

Referring back to FIG. 2, each manifold 60A, 60B further couples a linear bearing rail 80A, 80B to the support core support 24 on each side of the armature assembly 14. Each linear bearing rail 80A, 80B is guided by at least one and preferably two linear bearing support assemblies 78 on each side of the armature assembly 14. The linear bearing support assemblies 78 include a block member 84 slidably coupled to each linear bearing rail 80A or 80B. The linear bearing support assemblies 78 are secured to the support structure 12 using support members 86.

Although the present invention has been described with reference to preferred embodiments, workers skilled in the art will recognize that changes may be made in form and detail without departing from the spirit and scope of the invention.

What is claimed is:

1. An electric linear motor comprising:
 a support structure;
 a stator assembly secured to the support structure; and
 an armature assembly secured to the support structure for guided movement relative to the stator assembly, the armature assembly including:
  a first plurality of magnetic devices;
  a second plurality of magnetic devices; and
  a core support having a first end and a second end, a first major surface extending from the first end to the second end in a longitudinal direction and a second major surface extending from the first end to the second end in the longitudinal direction and facing in a direction opposite the first major surface, the core support supporting the first plurality of magnetic devices in spaced apart relation in the longitudinal direction on the first major surface and supporting the second plurality of magnetic devices in spaced apart relation in the longitudinal direction on the second major surface, the core support having a plurality of fluid cooling passageways formed in the material of the core support between the first major surface and the second major surface, the plurality of fluid cooling passageways extending through the core support in a direction intersecting with the longitudinal direction.

2. The electric linear motor of claim 1 wherein a plurality of fluid cooling passageways is arranged proximate each magnetic device.

3. The electric linear motor of claim 2 wherein each fluid cooling passageway is disposed in the core support at a location of lower magnetic flux density.

4. The electric linear motor of claim 3 wherein each fluid cooling passageway is disposed along a plane bisecting a magnet.

5. The electric linear motor of claim 4 wherein each of the fluid cooling passageways extends through the core support in a direction orthogonal to linear motion of the armature assembly.

6. The electric linear motor of claim 5 wherein the core support includes a first edge extending from the first end to the second end and a second edge extending from the first end to the second end on a side opposite the first edge, wherein each fluid cooling passageway extends from the first edge of the core support to the second edge of the core support.

7. The electric linear motor of claim 6 and further comprising coupling passageways on each edge, each coupling passageway fluidly coupling in a successive manner adjacent fluid cooling passageways in the core support so as to configure the passageways for fluid flow in a zig-zag manner.

8. The electric linear motor of claim 7 wherein at least a portion a wall of each coupling passageway is formed from material of the core support.

9. The electric linear motor of claim 8 and further comprising a first guide member secured to the first edge and a second guide member secured to the second edge, each guide guiding the armature assembly for linear movement relative to the core support.

10. The electric linear motor of claim 9 wherein portions of each of the guides forms at least a portion of the wall of each coupling passageway.

11. The electric linear motor of claim 1 and further comprising a fluid source fluidly coupled to the fluid cooling passageways.

12. The electric linear motor of claim 11 wherein the fluid source comprises a pump.

13. The electric linear motor of claim 12 wherein a fluid flowing through the fluid cooling passageways comprises a liquid.

14. An electric linear motor comprising:
a support structure;
a stator assembly secured to the support structure; and
an armature assembly secured to the support structure for guided movement relative to the stator assembly, the armature assembly including:
a first plurality of magnetic devices;
a second plurality of magnetic devices; and
a core support having a first end and a second end, a first major surface extending from the first end to the second end in a longitudinal direction and a second major surface extending from the first end to the second end in the longitudinal direction and facing in a direction opposite the first major surface, the core support supporting the first plurality of magnetic devices in spaced apart relation in the longitudinal direction on the first major surface and supporting the second plurality of magnetic devices in spaced apart relation in the longitudinal direction on the second major surface, the core support having a fluid cooling passageway formed in the core support in a zig-zag manner in the longitudinal direction.

15. The electric linear motor of claim 14 wherein the core support includes a first edge extending from the first end to the second end and a second edge extending from the first end to the second end on a side opposite the first edge, wherein the fluid cooling passageway comprises a plurality of spaced-apart fluid cooling passageways extending from the first end the second end.

16. The electric linear motor of claim 15 and further comprising coupling passageways on each edge, each coupling passageway fluidly coupling in a successive manner adjacent fluid cooling passageways in the core support so as to configure the fluid cooling passageways for fluid flow in the zig-zag manner.

17. The electric linear motor of claim 16 wherein at least a portion a wall of each coupling passageway is formed from material of the core support.

18. The electric linear motor of claim 17 and further comprising a first guide member secured to the first edge and a second guide member secured to the second edge, each guide guiding the armature assembly for linear movement relative to the core support.

19. An electric linear motor comprising:
a support structure;
a stator assembly secured to the support structure; and
an armature assembly secured to the support structure for guided movement relative to the stator assembly, the armature assembly including:
a first plurality of magnetic devices;
a second plurality of magnetic devices;
a core support having a first end and a second end, a first major surface extending from the first end to the second end in a longitudinal direction and a second major surface extending from the first end to the second end in the longitudinal direction and facing in a direction opposite the first major surface, the core support supporting the first plurality of magnetic devices in spaced apart relation in the longitudinal direction on the first major surface and supporting the second plurality of magnetic devices in spaced apart relation in the longitudinal direction on the second major surface;
a first guide member secured to a first edge extending from the first end to the second end and a second guide member secured to a second edge extending from the first end to the second end on a side opposite the first edge, each guide guiding the armature assembly for linear movement relative to the stator assembly; and
the core support includes a fluid cooling passageway formed in the core support in a zig-zag manner in the longitudinal direction between the first guide member and the second guide member.

20. The electric linear motor of claim 19 wherein the core support comprises a plurality of spaced apart fluid passageways extending from the first edge to the second edge, and further comprising coupling passageways on each edge, each coupling passageway fluidly coupling in a successive manner adjacent fluid cooling passageways in the core support so as to configure the passageways for fluid flow in the zig-zag manner.

\* \* \* \* \*